(12) United States Patent
Zhao et al.

(10) Patent No.: US 9,917,701 B2
(45) Date of Patent: Mar. 13, 2018

(54) COMMUNICATION DEVICE

(71) Applicant: Kabushiki Kaisha Toshiba, Minato-ku (JP)

(72) Inventors: Fangming Zhao, Tokyo (JP); Yoshikazu Hanatani, Kanagawa (JP); Toru Kambayashi, Kanagawa (JP); Yoshihiro Oba, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 219 days.

(21) Appl. No.: 14/065,933

(22) Filed: Oct. 29, 2013

(65) Prior Publication Data
US 2014/0129689 A1 May 8, 2014

(30) Foreign Application Priority Data

Nov. 2, 2012 (JP) ................... 2012-243120

(51) Int. Cl.
*H04L 12/18* (2006.01)
(52) U.S. Cl.
CPC .................. *H04L 12/185* (2013.01)
(58) Field of Classification Search
CPC .................. G06F 17/30356; H04L 41/082
USPC ........................................... 709/221
See application file for complete search history.

(56) References Cited

U.S. PATENT DOCUMENTS

| 7,396,993 | B2 | 7/2008 | Tada | |
|---|---|---|---|---|
| 2003/0035425 | A1* | 2/2003 | Abdollahi | H04L 41/0213 370/392 |
| 2004/0054762 | A1* | 3/2004 | Parry | G06F 9/4411 709/221 |
| 2005/0172790 | A1 | 8/2005 | Tada | |

(Continued)

FOREIGN PATENT DOCUMENTS

| JP | 2003-330719 | 11/2003 |
|---|---|---|
| JP | 2005-84759 A | 3/2005 |
| JP | 2005-221657 | 8/2005 |

OTHER PUBLICATIONS

D. Forsberg, et al., "Protocol for Carrying Authentication for Network Access (PANA)", Network Working Group, Standards Track, May 2008, pp. 1-46.

(Continued)

*Primary Examiner* — Suraj Joshi
(74) *Attorney, Agent, or Firm* — Oblon, McClelland, Maier & Neustadt, L.L.P.

(57) ABSTRACT

According to an embodiment, a communication device includes a version storage unit, a receiving unit, a determining unit, and a command processing unit. The version storage unit is configured to store therein the first version information. The receiving unit is configured to receive a command including the second version information. The determining unit is configured to determine whether a version represented by the second version information is a next version after a version represented by the first version information. The command processing unit is configured to, (Continued)

based on a determination result of the determining unit and decision information that defines processes corresponding to a command and the determination result, execute processes corresponding to a received command.

13 Claims, 13 Drawing Sheets

(56) References Cited

U.S. PATENT DOCUMENTS

2009/0106628 A1* 4/2009 Aciicmez .............. G06F 21/554
                                                        714/763
2012/0250867 A1* 10/2012 Kambayashi ......... H04L 9/0844
                                                        380/282

OTHER PUBLICATIONS

Japanese Office Action issued in Japanese Patent Application No. 2012-243120, dated Aug. 16, 2016. With machine generated English translation. (7 pages).

* cited by examiner

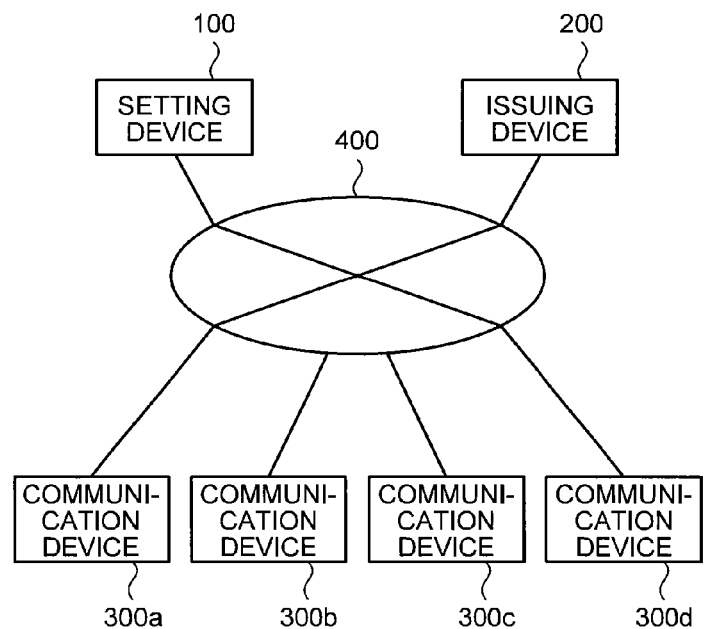
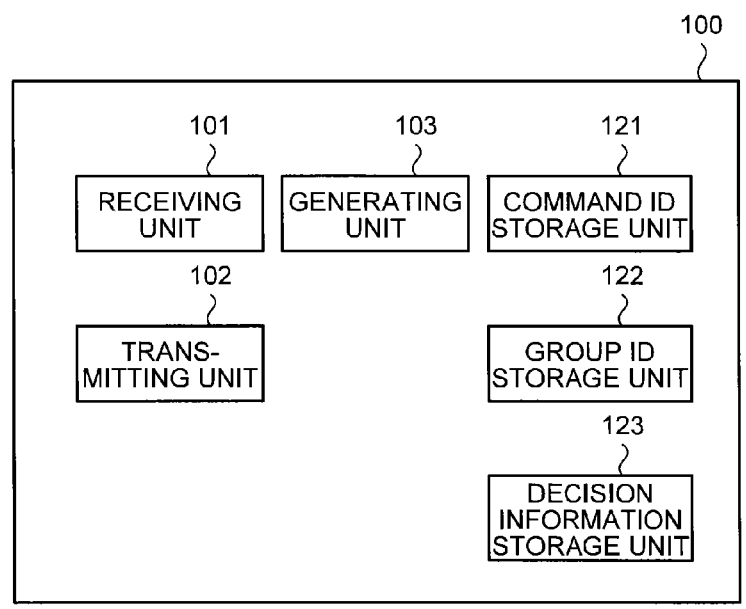

COMMUNICATION DEVICE

CROSS-REFERENCE TO RELATED APPLICATION(S)

This application is based upon and claims the benefit of priority from Japanese Patent Application No. 2012-243120, filed on Nov. 2, 2012; the entire contents of which are incorporated herein by reference.

FIELD

Embodiments described herein relate generally to a communication device.

BACKGROUND

There is a method of managing communication devices in a group in order to efficiently manage a number of communication devices that are connected via a network. A communication device (hereinafter, referred to as an "issuing device") that issues a group management command issues a command to a group of communication devices, for example, using multicast communication. The communication devices belonging to the group perform processing according to a received command.

At this time, a problem may occur in a system when processing is performed according to a command issued in the past. In order to incur the problem, a retransmission attack is known in which a command issued in the past is intentionally retransmitted. As a method of preventing this attack, there is a method of adding version information to each command and determining whether a command is a command issued in the past.

However, when typical multicast communication is used, it is not guaranteed that the order in which the issuing device transmits the commands is the same as the order in which the communication devices of the same group receive the commands. In addition, data transmitted by the issuing device is unlikely to reach a target communication device. In a state in which the command is not received, when a command received thereafter is executed, a problem may occur in connection with the consistency of process or an internal state of the communication device. Meanwhile, when execution of a command received after a reception failure is detected is put on hold, a problem occurs in readiness of a system. When a reception failure occurs, an optimal command processing method differs according to a configuration, a status, or the purpose of a system. For this reason, it is difficult for a communication device to decide an optimal processing method based on the received command and to execute the command.

BRIEF DESCRIPTION OF THE DRAWINGS

FIG. 1 is a block diagram illustrating a communication system according to a first embodiment;

FIG. 2 is a block diagram illustrating a setting device according to the first embodiment;

DETAILED DESCRIPTION

Figure 3:
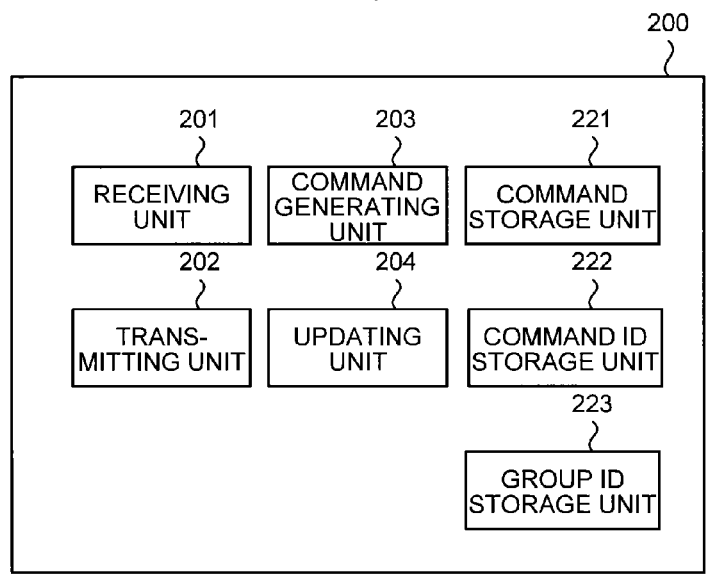
FIG. 3 is a block diagram illustrating an issuing device according to the first embodiment.

According to an embodiment, a communication device includes a version storage unit, a receiving unit, a determining unit, and a command processing unit. The version storage unit is configured to store therein the first version information. The receiving unit is configured to receive a command including the second version information. The determining unit is configured to determine whether a version represented by the second version information is a next version after a version represented by the first version information. The command processing unit is configured to, based on a determination result of the determining unit and decision information that defines processes corresponding to a command and the determination result, execute processes corresponding to a received command.

Hereinafter, various embodiments will be described in detail with reference to the accompanying drawings.

First Embodiment

A communication system according to a first embodiment uses, in addition to version information, decision information defining processing to be execute by a communication device when a version information mismatch (non-nextity) occurs (a reception failure occurs). An issuing device issues a command that is added with version information corresponding to the order in which a command is issued to a certain group ID but does not include decision information. A setting device generates decision information corresponding to a group, and provides the decision information to a communication device belonging to the group. The communication device may detect a command reception failure by checking whether a version represented by the version information is the next version. In addition, when a command reception failure is detected, the communication device decides processing to be executed with reference to the decision information. Thus, reliability and availability of group management, for example, using multicast communication can be increased.

FIG. 1 is a block diagram illustrating an example of a configuration of the communication system according to the first embodiment. The communication system according to the present embodiment includes a setting device 100, an issuing device 200, and communication devices 300a to 300d, which are connected to one another via a network 400 as illustrated in FIG. 1.

The setting device 100 is a communication device that transmits the decision information to the communication devices 300a to 300d so that the decision information is set to the communication devices 300a to 300d. The issuing device 200 is a communication device that issues a command for group management. The network 400 is not limited to a wired network or a wireless network, and all types of networks can be used as the network 400.

The number of the setting devices 100, the number of the issuing devices 200, and the number of the communication devices 300a to 300d are not limited to 1 (one), 1 (one), and 4 (four), respectively. The communication devices 300a to 300d have the same configuration as one another and thus are referred to collectively as a "communication device 300" when the communication devices 300a to 300d need not be particularly distinguished.

In the first embodiment, the decision information is allocated to each group to which the communication devices 300 belong. In other words, the setting device 100 generates the decision information for each group, and allocates the decision information corresponding to a certain group to the communication devices 300 belonging to the certain group. The decision information is information defining processing to be executed when a command reception failure occurs.

The issuing device 200 generates a next version after the latest version issued to a group of a command target when issuing a new command. The issuing device 200 issues a command including version information representing the generated version. For example, the next version is a version obtained by numerically adding "1" to a certain version. Alternatively, x may be used as a certain version, and a next version after x may be derived by f(x). Here, f represents any function determined by the system in advance. The next version is not limited to one obtained by the above-described method, and may be obtained by any method of nextly deciding a next version according to any rule determined by a system in advance.

As the command is issued as described above, the communication devices 300 belonging to a group can check whether a version of a received command is the next version and decide whether a reception failure of a command issued to a group to which the communication devices 300 belongs has occurred. In addition, the communication device 300 can appropriately cope with the command reception failure by performing processing decided based on the decision information allocated by the setting device 100. As described above, the decision information is allocated to the group of the communication devices 300, and thus availability and reliability of a system can be maintained even when a command reception failure occurs.

In the first embodiment, a command issued by the issuing device 200 includes at least identification information identifying a command target and a command ID specifying a command. For example, the identification information of the command target is a group ID identifying a group.

Further, the decision information includes connection destination information, a truth value, and a command ID list. The connection destination information is information specifying an external device that transmits data indicating that a non-next version is detected. The truth value is a value defining whether a command is to be executed when a non-next version is detected. The command ID list is information representing a command ID of a command which is received but not to be executed after a non-next version is detected.

The above-described data structure of the decision information is an example. Instead of deciding and managing a command ID to which the decision information is to be applied such that the group ID, the command ID, and the decision information are recorded in a decision information storage unit 322 (which will be described below) in association with one another as in the first embodiment, information representing a command ID to which the decision information is to be applied may be included in the decision information.

Further, any information may be used as the decision information as long as the information is used to decide processing to be executed when a command reception failure is detected. For example, the decision information may be a script that returns processing to be executed in response to an input of a group ID and a command ID of a determination target. When such a script is used, it is unnecessary to store the group ID, the command ID, and the decision information in association with one another. Alternatively, the decision information may be a script that returns processing to be executed when a command reception failure occurs, by accessing a version storage unit 321 (which will be described below) and the decision information storage unit 322 (which will be described below) of the communication device 300 when a received command is input. When such a script is used, a storage unit that manages an ID can be easily managed.

Next, a configuration example of the setting device 100 will be described. FIG. 2 is a block diagram illustrating a functional configuration example of the setting device 100. The setting device 100 includes a receiving unit 101, a transmitting unit 102, a generating unit 103, a command ID storage unit 121, a group ID storage unit 122, and a decision information storage unit 123.

The receiving unit 101 receives various kinds of data transmitted from an external device such as the communication device 300. Examples of data transmitted from the external device include an update request of decision information, a setting request of decision information to be applied to a group ID, and a setting request of decision information to be applied to a command ID.

The command ID storage unit 121 stores therein a command ID of a command that can be issued by the issuing device 200.

The group ID storage unit 122 stores therein a group ID of a group that can be set as a command target by the issuing device 200.

The decision information storage unit 123 stores therein decision information that has been issued until now, a group ID and a command ID to which the decision information is to be applied, in association with one another.

The generating unit 103 generates the decision information to be transmitted to the communication device 300. For example, the generating unit 103 reads data from the command ID storage unit 121, the group ID storage unit 122, and the decision information storage unit 123 as necessary based on data received from the receiving unit 101, and generates data including a group ID, a command ID, and one or more pieces of decision information. The generating unit 103 transfers the generated data to the transmitting unit 102.

The transmitting unit 102 transmits the data received from the generating unit 103 to the communication device 300 belonging to a group identified by a group ID.

Next, a configuration example of the issuing device 200 will be described. FIG. 3 is a block diagram illustrating a functional configuration example of the issuing device 200. The issuing device 200 includes at least a receiving unit 201, a transmitting unit 202, a command generating unit 203, an updating unit 204, a command storage unit 221, a command ID storage unit 222, and a group ID storage unit 223.

The receiving unit 201 receives various kinds of data transmitted from an external device such as the issuing device 200 or the communication device 300. Examples of information to be received includes the decision information issued by the setting device 100, a request to issue a command that includes a group ID and is to be issued to a group of the group ID, and a request to issue a command that includes a command ID and a command content and corresponds to the command ID.

The command ID storage unit 222 stores therein a command ID. The group ID storage unit 223 stores therein a group ID. The command storage unit 221 stores therein a group ID, a command ID of a command issued to a group of the group ID, and version information in association with one another.

The command generating unit 203 generates a command including a group ID, a command ID, and version information according to information received by the receiving unit 201 with reference to information stored in the command storage unit 221, the command ID storage unit 222, and the group ID storage unit 223.

The transmitting unit 202 transmits data including the command received from the command generating unit 203. This command may be transmitted by a method by which the command can reach besides the communication devices 300 belonging to a group specified by a group ID such as broadcast communication or a plurality of multicast communication.

Figure 4:
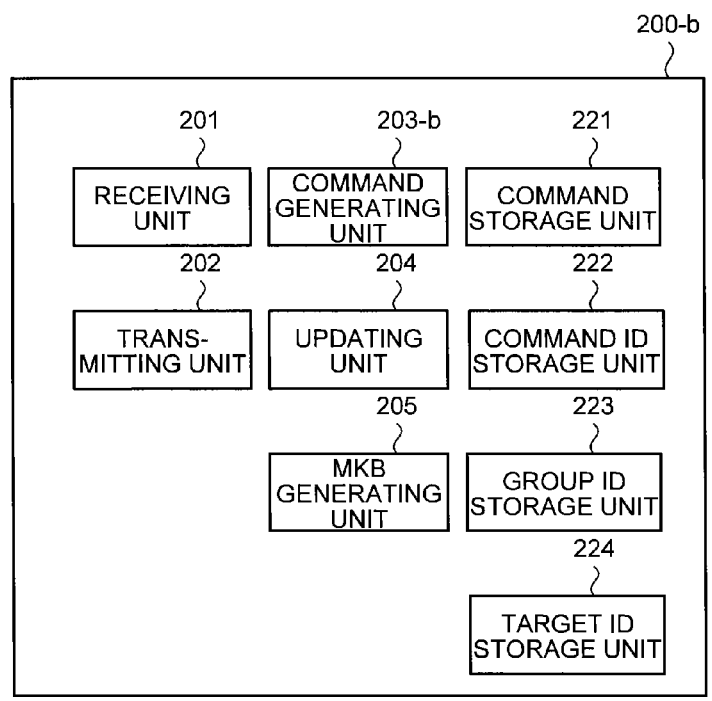
FIG. 4 is a block diagram illustrating another configuration example of the issuing device according to the first embodiment.

The issuing device may be configured to issue a command causing the communication devices 300 belonging to a group to perform an operation of changing a group or the like. FIG. 4 is a block diagram illustrating a configuration example of an issuing device 200-b having the above configuration. The issuing device 200-b includes a receiving unit 201, a transmitting unit 202, a command generating unit 203-b, an updating unit 204, a command storage unit 221, a command ID storage unit 222, a group ID storage unit 223, a target ID storage unit 224, and a media key block (MKB) generating unit 205. The same components as in FIG. 3 are denoted by the same reference numerals, and a description thereof will not be presented.

The target ID storage unit 224 stores therein a group ID and a list of IDs of the communication devices 300 currently belonging to a group identified by the group ID.

The MKB generating unit 205 stores therein all device keys held by the communication device 300. Upon receiving a list of IDs (device IDs) identifying the communication devices 300, the MKB generating unit 205 generates a group key, and generates an MKB from which only the communication device 300 identified by the device ID included in the list can derive the generated group key.

The command generating unit 203-b generates a command further including the generated MKB.

For example, the communication device 300, which has received such a command, processes the MKB included in the command using a device key of its own device. When processing is normally performed, this means that its own device belongs to a group designated by the command, and thus, for example, the communication device 300 changes a setting to belong to the designated group. However, when processing is not normally performed, this means that its own device does not belong to a group designated by the command, and thus, for example, the communication device 300 changes a setting to leave the designated group.

Figure 5:
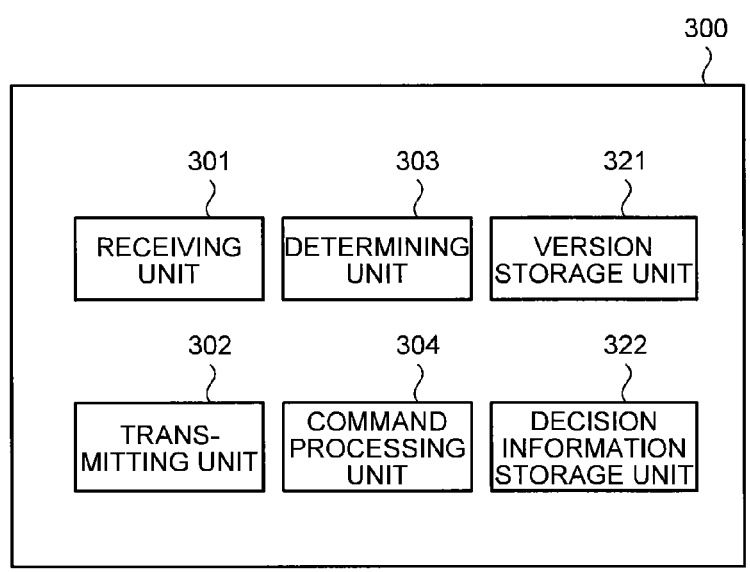
FIG. 5 is a block diagram illustrating a communication device according to the first embodiment.

Next, a configuration example of the communication device 300 will be described. FIG. 5 is a block diagram illustrating of a functional configuration example of the communication device 300. The communication device 300 includes a receiving unit 301, a transmitting unit 302, a determining unit 303, a command processing unit 304, a version storage unit 321, and a decision information storage unit 322.

The receiving unit 301 receives a command transmitted from the issuing device 200.

The version storage unit 321 stores therein a group ID included in the command received from the command processing unit 304 in association with version information. In the present embodiment, when a group ID is allocated for the first time, only a group ID is assumed to be stored in the version storage unit 321. This is an example. Alternatively, as will be described below, management of a group to which the communication device 300 belongs may be performed by providing a group ID storage unit that stores therein a group ID of a group to which the communication device 300 belongs.

The decision information storage unit 322 stores therein a command ID in association with the decision information.

The determining unit 303 determines whether a version is the next version. For example, the determining unit 303 determines whether the version information included in the received command represents a next version after the version represented by the version information stored in the version storage unit 321.

The command processing unit 304 processes the command by deciding processing to be executed corresponding to the received command based on the determination result by the determining unit 303 and the decision information stored in the decision information storage unit 322, and then executing the processing corresponding to the received command. For example, a plurality of types of processing corresponding to the received command may be decided based on the determination result, the decision information, and the received command, and the plurality of types of processing may be executed. Further, in order to decide processing to be executed, an internal status held by the communication device 300 may be referred to. Example of the internal status include date and time or time information, transmission and reception history, executed command history, or a version of firmware.

The storage units of the respective devices may be configured with any of typically used storage media such as a hard disk drive (HDD), an optical disk, a memory card, and a random access memory (RAM).

For example, the respective components (the receiving unit 101, the transmitting unit 102, the generating unit 103, the receiving unit 201, the transmitting unit 202, the command generating unit 203, the updating unit 204, the receiving unit 301, the transmitting unit 302, the determining unit 303, the command processing unit 304, and the like) other than the storage unit may cause a processing device such as a central processing unit (CPU) to execute a program, that is, software, hardware such as an integrated circuit (IC), or by using both software and hardware.

Next, command processing by the communication device 300 according to the first embodiment having the above configuration will be described with reference to FIG. 6.

Figure 6:
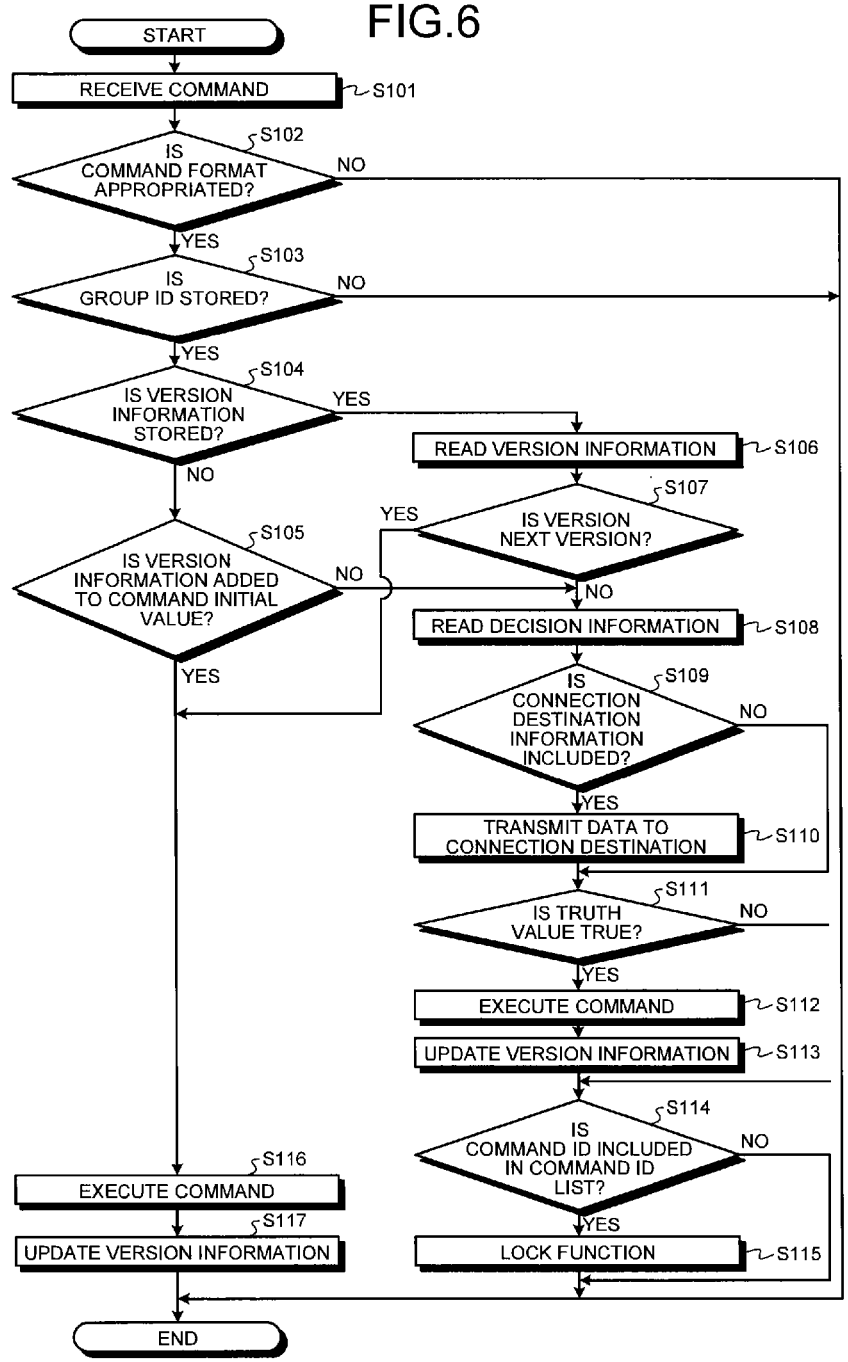
FIG. 6 is a flowchart of a process of command processing according to the first embodiment.

FIG. 6 is a flowchart illustrating an example of a process of command processing according to the first embodiment.

When a command is issued from the issuing device 200, the receiving unit 301 receives the command (step S101). The determining unit 303 performs the following determination on the command received by the receiving unit 301.

The determining unit 303 determines whether a format of the received command is appropriate (step S102). For example, the determining unit 303 determines whether the received command is a command including a group ID and version information. When it is determined that the format of the received command is not appropriate (No in step S102), the command processing ends.

When it is determined that the form of the received command is appropriate (Yes in step S102), that is, for example, when the received command is a command including a group ID and version information, the determining unit 303 determines whether the group ID included in the command is stored in the version storage unit 321 (step S103).

When there is no matching group ID (No in step S103), the determining unit 303 determines that the command does not target of its own device, and ends the command processing corresponding to the received command.

When there is a matching group ID (Yes in step S103), the determining unit 303 determines whether the version information stored in association with the group ID is stored in the version storage unit 321 (step S104). When the version information is not stored (No in step S104), the determining unit 303 determines whether the version information included in the command is an initial value (step S105). Here, the initial value is a fixed value previously shared by a system such as 0 or 1, for example. Any information that can be recognized as the initial value by the communication device 300 belonging to the system can be used as the initial value.

When the version information is stored (Yes in step S104), the determining unit 303 reads the latest version information stored in association with the group ID from the version storage unit 321 (step S106). The determining unit 303 determines whether a version represented by the read version information is a next version after a version represented by the version information included in the command (step S107).

When the version represented by the read information is the next version (Yes in step S107) or when the version information is the initial value (Yes in step S105), the determining unit 303 transfers the determination result representing the positive determination and the command to the command processing unit 304. However, when the version represented by the read version information is not the next version (No in step S107) or when the version information is not the initial value (No in step S105), the determining unit 303 transfers the determination result representing the negative determination and the command to the command processing unit 304.

The command processing unit 304 operates as follows when the determination result and the command are received from the determining unit 303.

When the determination result is positive, the command processing unit 304 executes processing designated by the command (step S116). The command processing unit 304 transfers the command after execution to the version storage unit 321, and updates the version information of the command after execution (step S117).

When the determination result is negative, the command processing unit 304 reads the decision information corresponding to the command ID included in the command from the decision information storage unit 322 (step S108). As described above, the decision information includes connection destination information, a truth value, and a command ID list.

The command processing unit 304 determines whether the connection destination information is included in the read decision information (step S109). When it is determined that the connection destination information is included in the read decision information (Yes in step S109), the command processing unit 304 transmits, to the external device specified by the connection destination information, data representing that the version is not the next version through the transmitting unit 302 (step S110). Examples of the external device include a dedicated external device that takes a countermeasure when the version is not the next version, the issuing device 200, and the setting device 100. An example of the data representing that the version is not the next version is data including: a group ID; the latest version held by itself; and a version added to the received command.

When it is determined that the connection destination information is not included in the read decision information (No in step S109), the command processing unit 304 determines that it is unnecessary to notify the external device of the fact that the version is not the next version.

The command processing unit 304 determines whether the truth value included in the read decision information is true (step S111). When it is determined that the truth value is true (Yes in step S111), the command processing unit 304 executes processing corresponding to the command designated by the command (step S112). The command processing unit 304 transfers the command after execution to the version storage unit 321, and updates the version information of the command after execution (step S113). When it is determined that the truth value is false (No in step S111), the command processing unit 304 does not execute the processing designated by the command.

The command processing unit 304 determines whether the command ID of the received command is included in the command ID list of the read decision information (step S114). When it is determined that the command ID of the received command is included in the command ID list (Yes in step S114), the command processing unit 304 locks a function (step S115). The locking of the function represents that the function of the command specified by the command ID included in the command ID list is suspended after a point in time when it is determined that the version is not the next version. It may be configured to suspend the functions of all commands received after a point in time when it is determined that the version is not the next version. When the function is locked, the command processing unit 304 does not execute the processing corresponding to the command identified by the command ID included in the command ID list even when a new command is received.

When it is determined that the command ID of the received command is not included in the command ID list (No in step S114), the command processing unit 304 determines that it is unnecessary to lock the function.

The command processing unit 304 may release the locking of the function based on an instruction from the external device. Further, information representing a function locked by itself may be included in data representing that the version is not the next version.

The communication device 300 may be configured to further include a group ID storage unit (not illustrated) that stores therein a group ID of a group to which the communication device 300 belongs and a command ID storage unit (not illustrated) that stores therein a command ID of a command, the execution of which is permitted by the communication device 300. In this case, the determining unit 303 determines whether the group ID and the command ID included in the received command have been stored in the group ID storage unit and the command ID storage unit, respectively. The command processing unit 304 executes the received command when it is determined that the group ID and the command ID have been stored.

Figure 7:
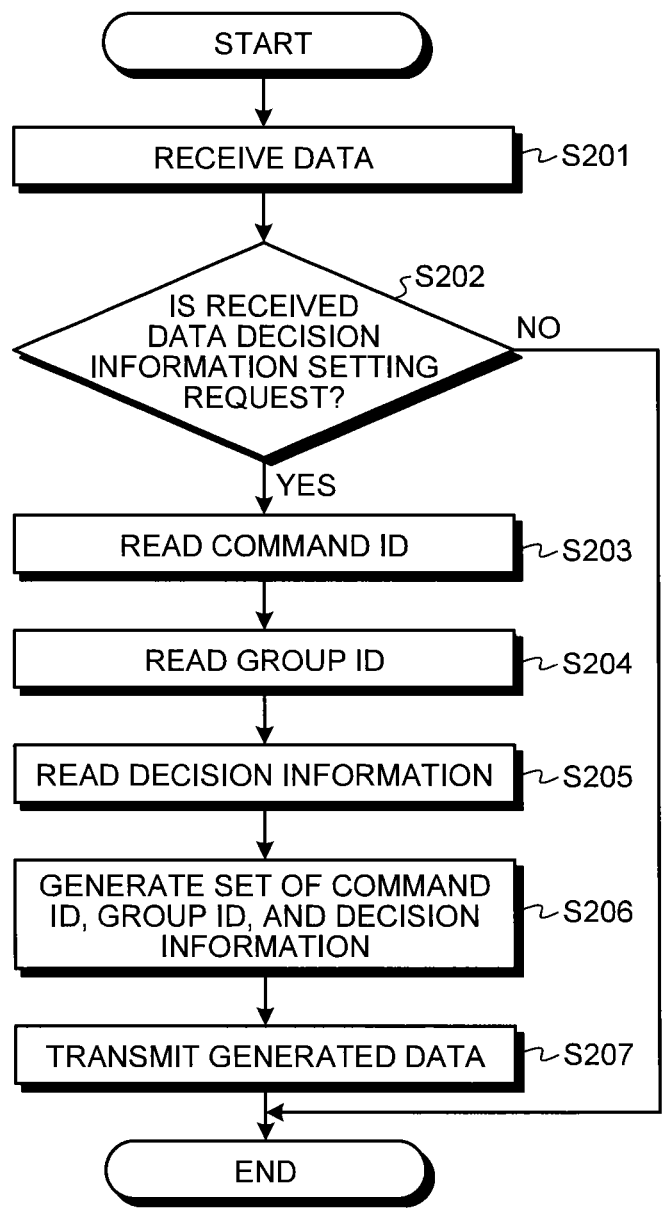
FIG. 7 is a flowchart of a setting process according to the first embodiment.

Next, a setting process by the setting device 100 according to the first embodiment having the above configuration will be described with reference to FIG. 7. FIG. 7 is a flowchart illustrating an example of the setting process according to the first embodiment.

The receiving unit 101 receives data transmitted from the external device (step S201). The receiving unit 101 determines whether the received data is a decision information setting request (or update request) (step S202). When it is determined that the received data is not the decision information setting request (or update request) (No in step S202), the setting process ends.

When it is determined that the received data is the decision information setting request (or update request) (Yes in step S202), the generating unit 103 reads the command ID of the command designated by the request from the command ID storage unit 121 (step S203). The generating unit 103 reads a group ID of a group designated by the request from the group ID storage unit 122 (step S204). The generating unit 103 reads the decision information designated by the request from the decision information storage unit 123 (step S205). The generating unit 103 generates data including the read command ID, the group ID, and the decision information (step S206).

The transmitting unit 102 transmits the generated data to the communication device 300 (step S207).

Figure 8:
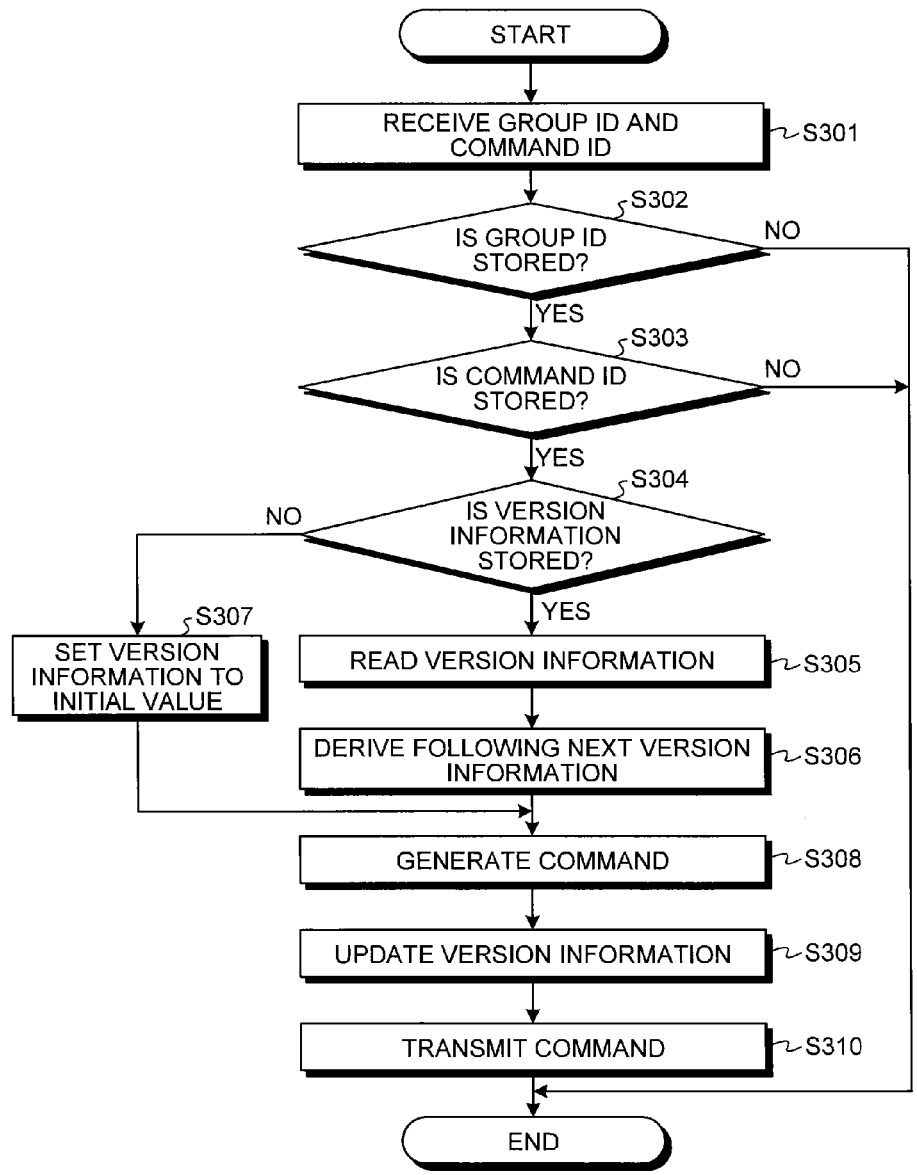
FIG. 8 is a flowchart of an issuing process according to the first embodiment.

Next, an issuing process by the issuing device 200 according to the first embodiment having the above configuration will be described with reference to FIG. 8. FIG. 8 is a flowchart illustrating an example of the issuing process according to the first embodiment.

For example, the receiving unit 201 receives a group ID and a command ID as a command issue request (step S301). This means that a command of the received command ID is issued to a group of the received group ID.

The command generating unit 203 determines whether the received group ID is stored in the group ID storage unit 223 with reference to the group ID storage unit 223 (step S302). When it is determined that the received group ID is not stored in the group ID storage unit 223 (No in step S302), the issuing process ends.

When it is determined that the received group ID is stored in the group ID storage unit 223 (Yes in step S302), the command generating unit 203 determines whether the received command ID is stored in the command ID storage unit 222 with reference to the command ID storage unit 222 (step S303). When it is determined that the received command ID is not stored in the command ID storage unit 222 (No in step S303), the issuing process ends.

When it is determined that the received command ID is stored in the command ID storage unit 222 (Yes in step S303), the command generating unit 203 determines whether the version information corresponding to the received group ID and the command ID is stored with reference to the command storage unit 221 (step S304).

When it is determined that the corresponding version information is stored (Yes in step S304), the command generating unit 203 reads the latest version information from the command storage unit 221 (step S305). Then, the command generating unit 203 generates version information representing a next version after a version represented by the latest version information (step S306). The command generating unit 203 generates a command including at least a group ID, a command ID, and the generated version information (step S308), and transfers the generated command to the transmitting unit 202. The command generating unit 203 stores the group ID, the command ID, and the generated version information representing the version in the command storage unit 221 in association with one another (step S309).

When it is determined that the corresponding version information is not stored (No in step S304), the command generating unit 203 sets an initial value of a version (step S307). The command generating unit 203 generates a command including at least a group ID, a command ID, and the version information representing the initial value of the version (step S308), and transfers the generated command to the transmitting unit 202. Then, the command generating unit 203 stores the group ID, the command ID, and the version information in the command storage unit 221 in association with one another (step S309). Here, any information that is previously shared by the system and thus can be recognized as the initial value by the communication device 300 such as 0 or 1 can be used as the initial value as described above.

The transmitting unit 202 transmits the command generated by the command generating unit 203 through broadcast communication, multicast communication, or the like (step S310).

First Modification

In the above embodiment, the version information is stored for each group ID (the version storage unit 321). In a first modification of the first embodiment, the version information is stored for each group ID and each command ID. For example, the version storage unit 321 stores the group ID, the command ID, and the version information included in the command received by the command processing unit 304 in association with one another.

The determining unit 303 determines whether the group ID, the command ID included in the command, and the version information are stored in the version storage unit 321 in association with one another instead of determining whether the group ID and the version information is stored in the version storage unit 321 in association with one another.

Figure 9:
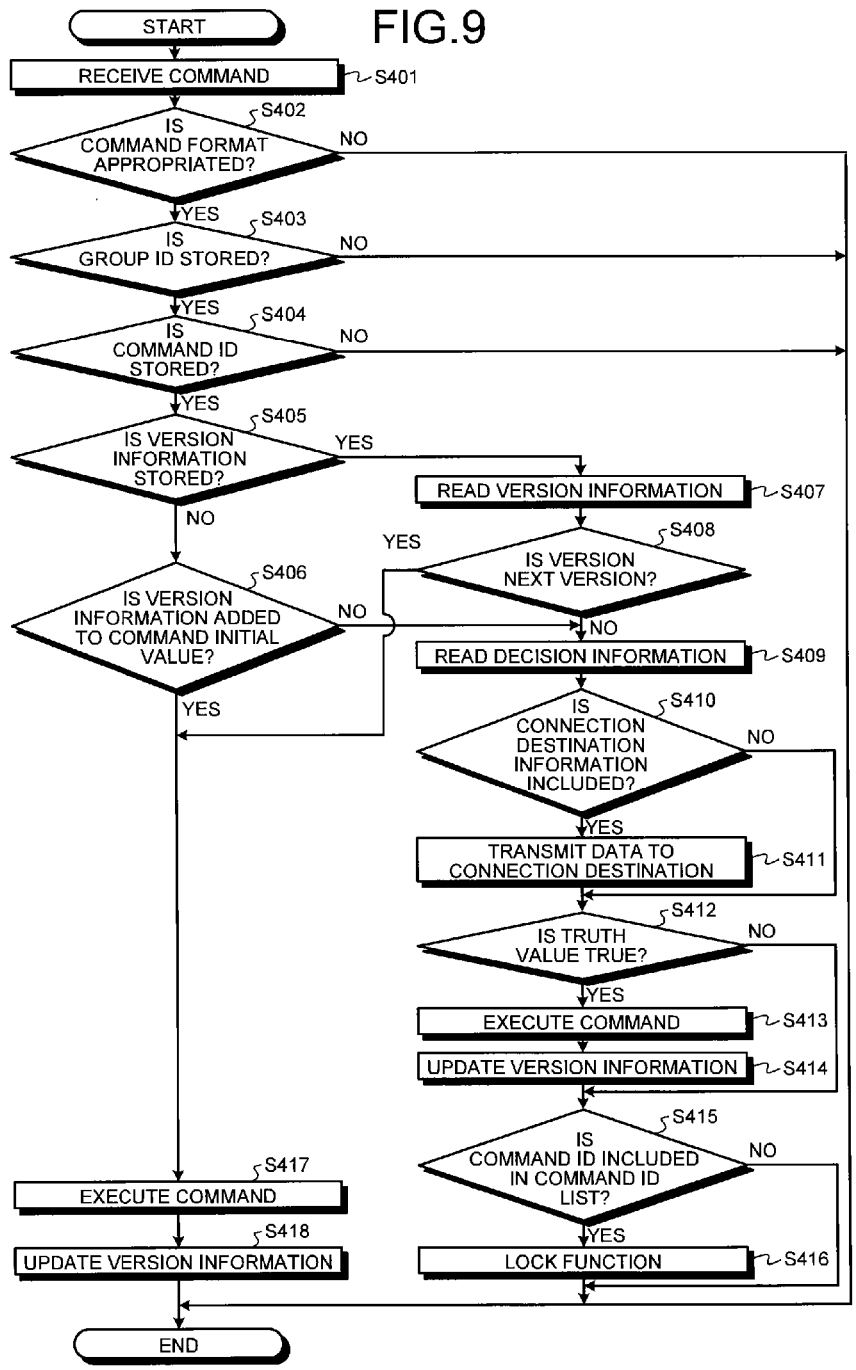
FIG. 9 is a flowchart of a process of command processing by a communication device according to a first modification.

FIG. 9 is a flowchart illustrating an example of a process of command processing by a communication device according to the first modification. FIG. 9 differs from FIG. 6 representing the process of the command processing according to the first embodiment in that step S404 is added and step S406 is different. The other steps S401 to S403 and S406 to S418 are the same as steps S101 to S103 and S105 to S117 of FIG. 6, and thus a description thereof will not be made.

In step S404, the determining unit 303 determines whether the command ID of the command is stored in the version storage unit 321 (step S404). When it is determined that the command ID of the command is not stored in the version storage unit 321 (No in step S404), the command processing ends. When it is determined that the command ID of the command is stored in the version storage unit 321 (Yes in step S404), the process proceeds to step S405.

In step S406, the determining unit 303 determines whether the version information stored in association with the group ID and the command ID included in the received command is stored in the version storage unit 321.

The issuing device 200 may be configured to read the version information corresponding to the group ID and the command ID when referring to the command storage unit 221 and allocate the initial value as the version information when the corresponding version information is not stored.

When the communication device 300 and the issuing device 200 are configured as described above, a next version can be allocated for each command ID. At this time, even when the issuing device 200 is divided into two or more according to the command, since the version information need not be shared between the plurality of issuing devices 200, there is an advantage by which the system can be efficiently implemented. Further, a command ID specifying a plurality of commands may be used instead of a command ID uniquely specifying a command.

Second Modification

The setting device 100 may be configured to issue a command commanding the communication device 300 to perform movement of a group together with the decision information. The setting device 100 may further include the same function as the MKB generating unit 205. The setting device 100 may generate a command, which further includes an MKB generated by the function, commanding movement of a group and the decision information.

As the command is issued by the setting device 100, a setting of a group of the communication device 300 and allocation of the decision information to a corresponding group can be efficiently implemented.

As described above, in the communication system according to the first embodiment, the communication device decides processing with reference to the decision information defining processing to be executed when a version represented by the version information is not the next version. Accordingly, reliability and availability of group management, for example, using multicast communication can be increased.

Second Embodiment

In the first embodiment, the communication device decides processing with reference to the decision information transmitted from the setting device. In the communication system according to the second embodiment, the issuing device adds the decision information to the command. The communication device decides processing with reference to the decision information included in the command.

Figure 10:
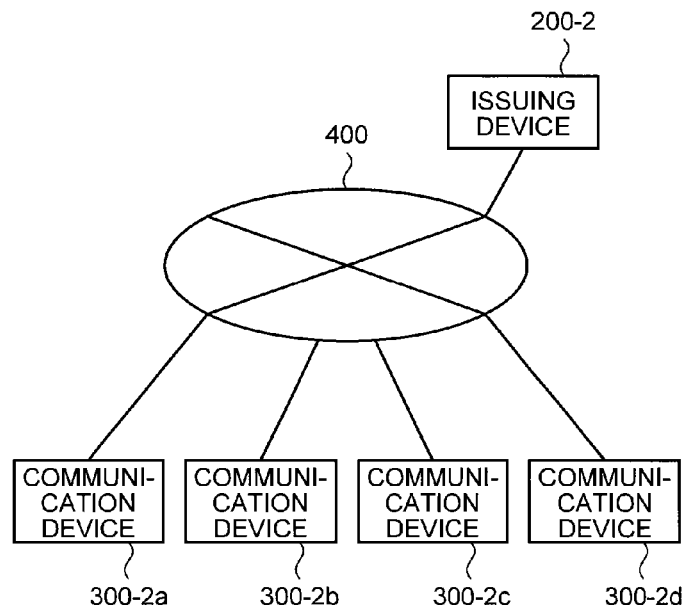
FIG. 10 is a block diagram of a communication system according to a second embodiment.

FIG. 10 is a block diagram illustrating an example of a configuration of the communication system according to the second embodiment. The communication system according to the present embodiment includes an issuing device 200-2 and communication devices 300-2a to 300-2d, which are connected via a network 400 as illustrated in FIG. 10.

In the second embodiment, a command issued by the issuing device 200-2 includes at least a group ID specifying a command target group, a command ID specifying a command, and decision information. The decision information includes connection destination information, a truth value, and a command ID list. Similarly to the first embodiment, the decision information is an example and not limited to the above format.

Figure 11:
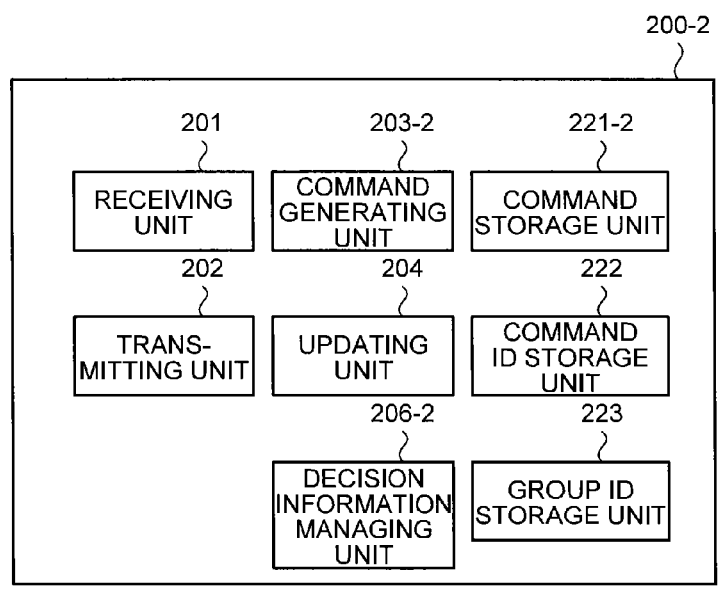
FIG. 11 is a block diagram illustrating a functional configuration example of an issuing device according to the second embodiment.

Next, a configuration example of the issuing device 200-2 will be described. FIG. 11 is a block diagram illustrating a functional configuration example of the issuing device 200-2. The issuing device 200-2 includes a receiving unit 201, a transmitting unit 202, a command generating unit 203-2, an updating unit 204, a decision information managing unit 206-2, a command storage unit 221-2, a command ID storage unit 222, and a group ID storage unit 223.

The second embodiment differs from the first embodiment in that the decision information managing unit 206-2 is added, and the data structure of the command storage unit 221-2 and the function of the command generating unit 203-2 are different. The remaining components and functions are the same as in FIG. 3 which is the block diagram of the issuing device 200 according to the first embodiment and thus are denoted by the same reference numerals, and a description thereof will not be repeated.

The decision information managing unit 206-2 generates the decision information and stores therein the generated decision information.

The command storage unit 221-2 stores therein a group ID, a command ID of a command issued to a group of a corresponding group ID, version information, and decision information in association with one another.

The command generating unit 203-2 generates a command with reference to information stored in the command storage unit 221-2, the command ID storage unit 222, the decision information managing unit 206-2, and the group ID storage unit 223 according to information received by the receiving unit 201.

Figure 12:
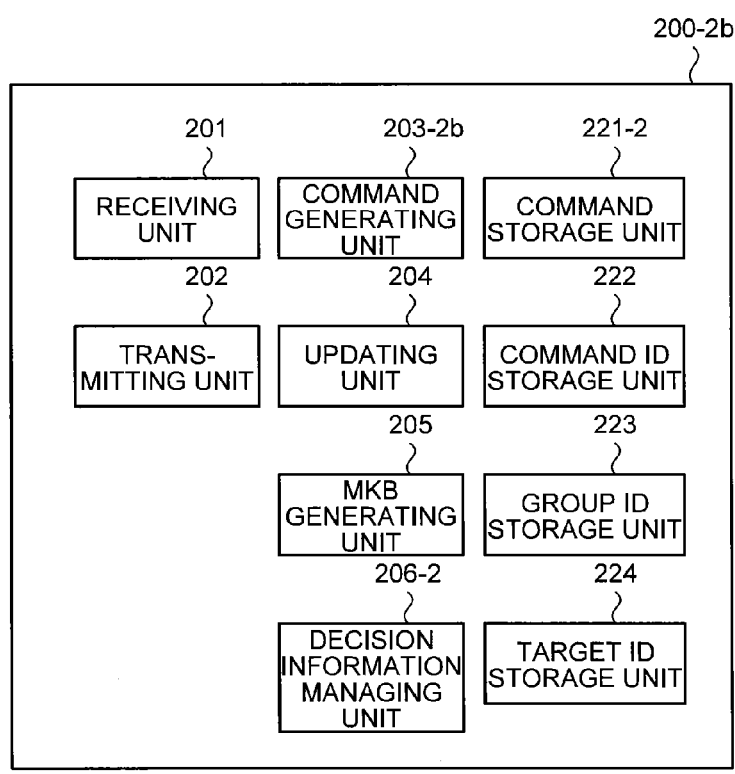
FIG. 12 is a block diagram illustrating another configuration example of the issuing device according to the second embodiment.

Similarly to the first embodiment, the issuing device may be configured to issue a command causing the communication device 300 belonging to a group to perform an operation of changing a group or the like. FIG. 12 is a block diagram illustrating a configuration example of the issuing device 200-2b configured as described above. The issuing device 200-2b includes a receiving unit 201, a transmitting unit 202, a command generating unit 203-2b, an updating unit 204, a decision information managing unit 206-2, a command storage unit 221-2, a command ID storage unit 222, a group ID storage unit 223, a target ID storage unit 224, and an MKB generating unit 205. The same components as in FIG. 4 and FIG. 11 are denoted by the same reference numerals, and thus a description thereof will not be made.

The command generating unit 203-2b generates a command further including the generated MKB.

Figure 13:
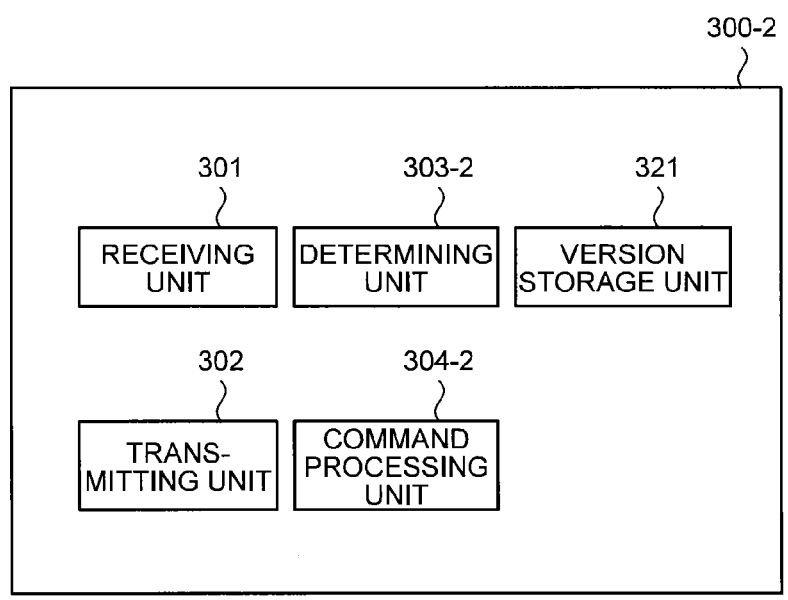
FIG. 13 is a block diagram of a communication device according to the second embodiment.

Next, a configuration example of the communication device 300-2 will be described. FIG. 13 is a block diagram illustrating a functional configuration example of the communication device 300-2. The communication device 300-2 includes a receiving unit 301, a transmitting unit 302, a determining unit 303-2, a command processing unit 304-2, and a version storage unit 321.

The second embodiment differs from the first embodiment in that the decision information storage unit 322 is not provided, and the function of the determining unit 303-2 and the function of the command processing unit 304-2 are different. The remaining components and functions are the same as in FIG. 5 which is the block diagram of the communication device 300 according to the first embodiment and thus denoted by the same reference numerals, and a description thereof will not be made.

The determining unit 303-2 differs from the determining unit 303 according to the first embodiment in that it is determined whether a command includes decision information in addition to a group ID and version information when a format of a command is determined. The remaining functions are the same as the determining unit 303 according to the first embodiment.

The command processing unit 304-2 differs from the command processing unit 304 according to the first embodiment in that the command is processed by deciding and executing processing corresponding to the received command with reference to the decision information included in the command rather than the stored decision information. The remaining functions are the same as the command processing unit 304 according to the first embodiment.

Figure 14:
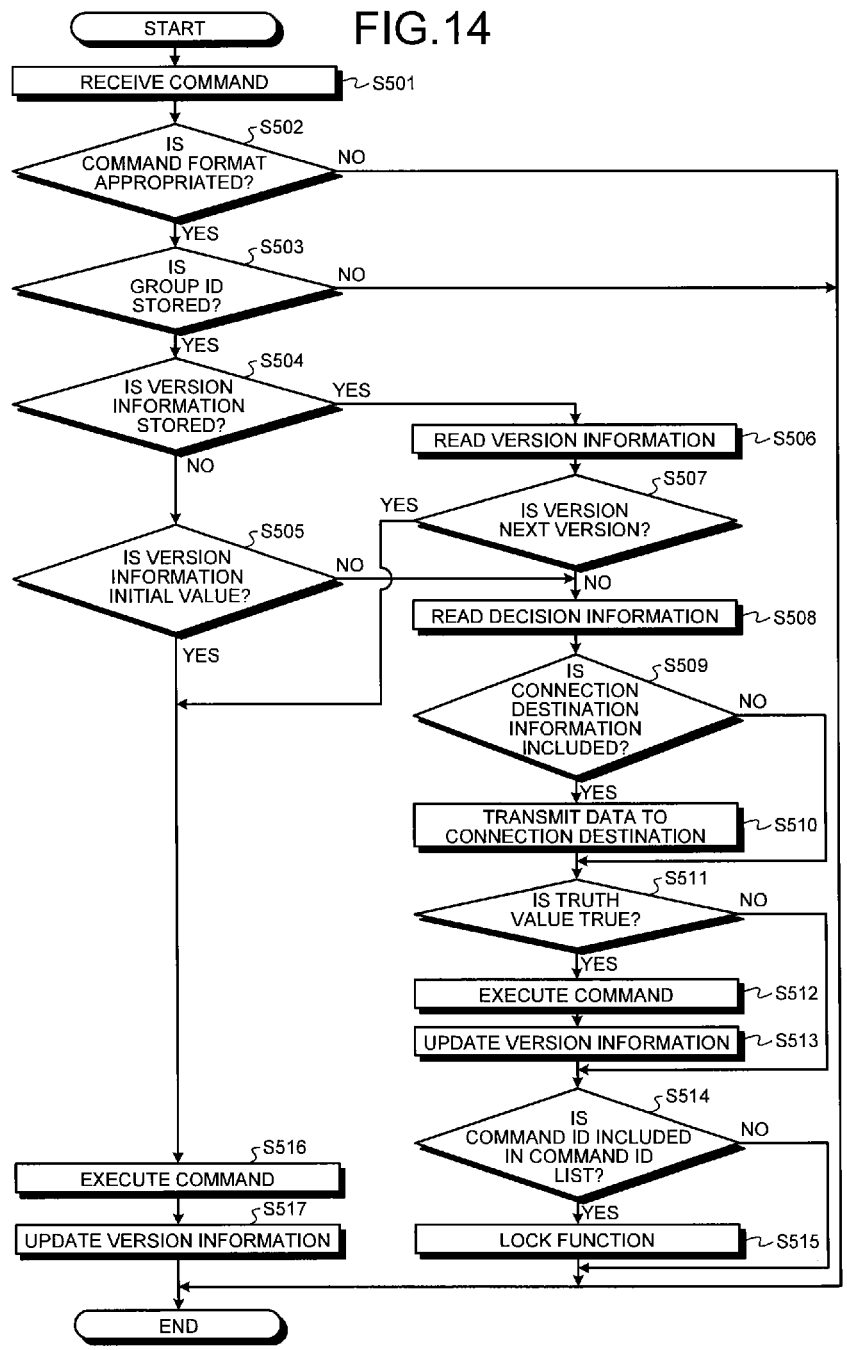
FIG. 14 is a flowchart of a process of command processing according to the second embodiment.

Next, a command processing by the communication device 300-2 according to the second embodiment having the above configuration will be described with reference to FIG. 14. FIG. 14 is a flowchart illustrating an example of a process of command processing according to the second embodiment.

In FIG. 14, steps S502 and S508 differ from steps S102 and S108 of FIG. 6 illustrating the command process according to the first embodiment. The remaining steps are the same as in FIG. 6, and thus a description thereof will not be made.

In step S502, the determining unit 303-2 determines whether the received command is a command including a group ID, version information, and decision information (step S502).

In step S508, the command processing unit 304-2 reads the decision information included in the received command (step S508).

Similarly to the first embodiment, the communication device 300-2 may be configured to further include a group ID storage unit (not illustrated) that stores therein a group ID of a group to which the communication device 300-2 belongs and a command ID storage unit (not illustrated) that stores therein a command ID of a command, the execution of which is permitted by the communication device 300-2. In this case, the determining unit 303-2 determines whether the group ID and the command ID included in the received command have been stored in the group ID storage unit and the command ID storage unit, respectively. The command processing unit 304-2 executes the received command when it is determined that the group ID and the command ID have been stored.

Figure 15:
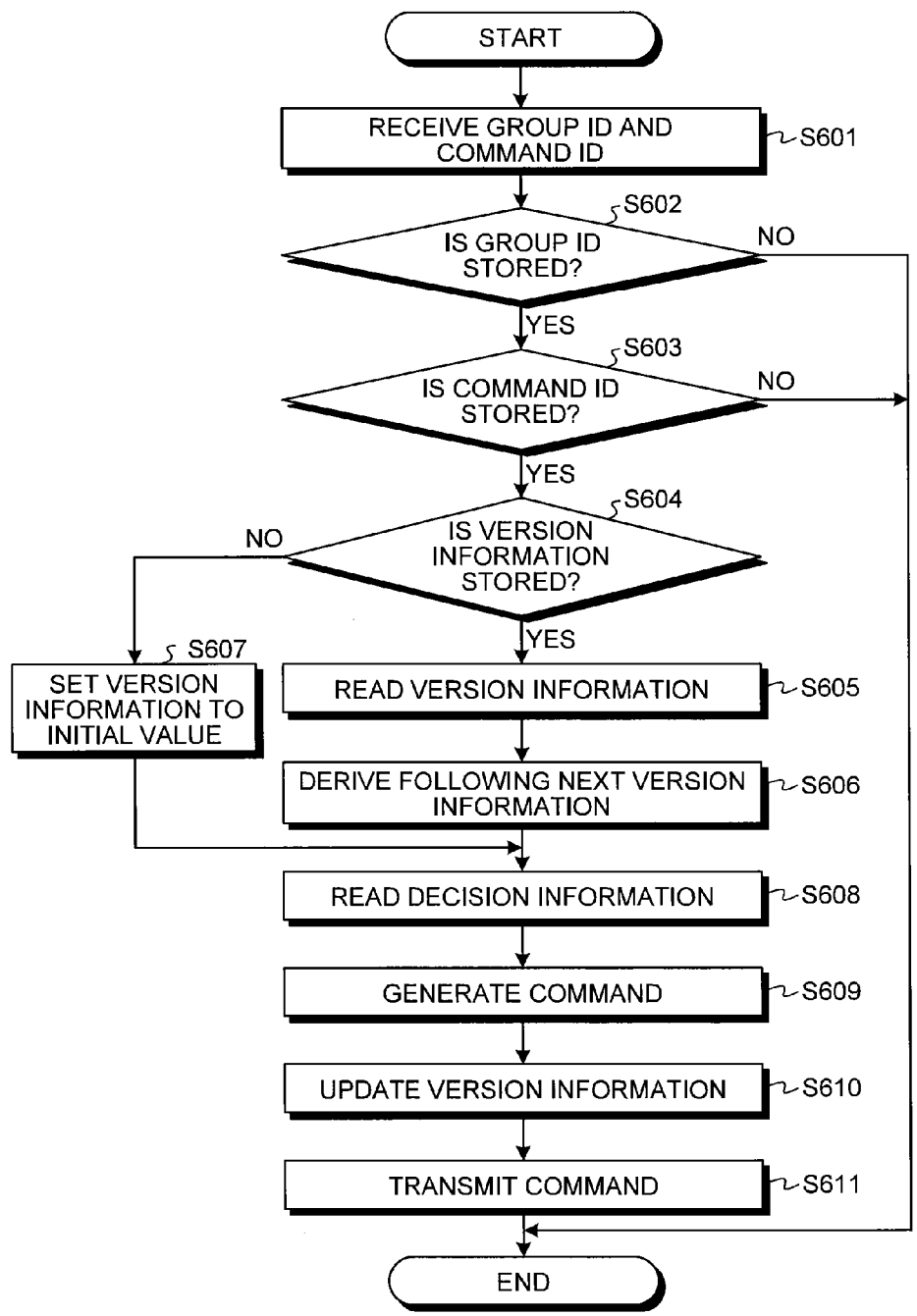
FIG. 15 is a flowchart of an issuing process according to the second embodiment.

Next, an issuing process by the issuing device 200-2 according to the second embodiment having the above configuration will be described with reference to FIG. 15. FIG. 15 is a flowchart illustrating an example of an issuing process according to the second embodiment.

Steps S601 to S607 are the same as steps S301 to S307 of FIG. 8 illustrating the issuing process according to the first embodiment, and thus a description thereof will not be made.

After the version information is set in step S606 or step S607, the command generating unit 203-2 reads the decision information corresponding to the group ID and the command ID with reference to the decision information managing unit 206-2 (step S608). The command generating unit 203-2 generates a command including at least a group ID, a command ID, the generated version information, and the decision information (step S609), and transfers the generated command to the transmitting unit 202. The command generating unit 203-2 stores the group ID, the command ID, the generated version information, and the decision information in the command storage unit 221-2 in association with one another (step S610).

The transmitting unit 202 transmits the command generated by the command generating unit 203-2 through broadcast communication, multicast communication, or the like (step S611).

Third Modification

The issuing device 200-2 may be configured to read the latest version information corresponding to the group ID and the command ID when referring to the command storage unit 221-2 and allocate the initial value as the version information when the corresponding version information is not stored.

Further, when the determining unit 303-2 of the communication device 300-2 may determine whether the group ID and the command ID is stored in association with each other in determination on whether the group ID included in the command is stored in the version storage unit 321.

When the communication device 300-2 and the issuing device 200-2 are configured as described above, the version information can be allocated for each set of a group ID and a command ID. Thus, even when the issuing device 200-2 issuing a corresponding command for each command ID is divided, the version information need not be shared.

As described above, in the communication device according to the second embodiment, processing can be decided and executed with reference to the decision information included in the command. Accordingly, reliability and availability of group management, for example, using multicast communication can be increased.

Figure 16:
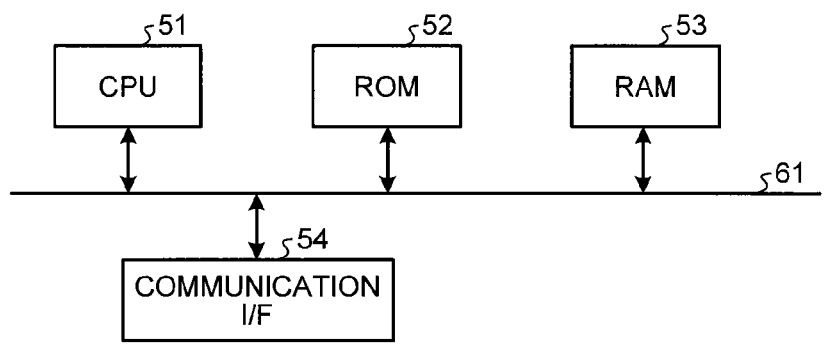
FIG. 16 is a hardware configuration diagram of a communication device according to an embodiment.

Next, a hardware configuration of the communication device according to the first or second embodiment will be described with reference to FIG. 16. FIG. 16 is an explanatory diagram illustrating a hardware configuration of the communication device according to the first or second embodiment.

The communication device according to the first or second embodiment includes a control device such as a central processing unit (CPU) 51, a storage device such as a read only memory (ROM) 52 and a random access memory (RAM) 53, a communication interface (I/F) 54 connected to a network to perform communication, and a bus 61 connecting the components with one another.

A program executed by the communication device according to the first or second embodiment is embedded in the ROM 52 or the like and provided.

The program executed by the communication device according to the first or second embodiment may be configured to be recorded in a computer readable recording medium such as a compact disk read only memory (CD-ROM), a flexible disk (FD), a compact disk recordable (CD-R), a digital versatile disk (DVD) as a file having an installable format or an executable format and provided as a computer program product.

Further, the program executed by the communication device according to the first or second embodiment may be configured to be stored on a computer connected to a network such as the Internet, and provided by downloading via a network. Further, the program executed by the communication device according to the first or second embodiment may be configured to be provided or distributed via a network such as the Internet.

The program executed by the communication device according to the first or second embodiment causes a computer to function as the respective components of the communication device. The computer can read out the program from the computer readable recording medium to a main storage device and execute the program through the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device, comprising:
   a memory configured to store therein first version information;
   a receiver configured to receive a command including second version information;
   a determining circuit configured to determine whether a version represented by the second version information is a next version after a version represented by the first version information; and
   a command processing circuit configured to, based on a determination result of the determining circuit and decision information that defines processes corresponding to the command and the determination result, execute processes corresponding to the received command, wherein
   the decision information is transmitted from a setting device,
   the decision information includes a truth value that defines whether a process corresponding to the command is to be executed when the version represented by the second version information is not the next version, and
   the command processing circuit executes processes corresponding to the received command when it is determined that the version represented by the second version information is not the next version and the truth value in the decision information defines that the process corresponding to the command is to be executed and does not execute the processes corresponding to the received command when it is determined that the version represented by the second version information is not the next version and the truth value in the decision information defines that the process corresponding to the command is not to be executed.

2. The device according to claim 1, further comprising,
   a decision information storage memory configured to store therein the decision information,
   wherein the command processing circuit executes processes corresponding to the received command based on the determination result and the decision information stored in the decision information storage memory.

3. The device according to claim 1,
   wherein the memory stores therein the first version information in association with each piece of first identification information identifying a command target,
   the receiver receives the command further including the first identification information, and
   the determining circuit determines whether the version represented by the second version information is the next version after the version represented by the first version information corresponding to the first identification information included in the received command.

4. The device according to claim 1,
   wherein the command processing circuit executes processes corresponding to the received command based on the determination result and the decision information that is defined for each command target.

5. The device according to claim 1,
   wherein the command processing circuit executes processes corresponding to the received command based on the determination result and the decision information that is defined for each command target and for each command.

6. A communication device, comprising:
   a memory configured to store therein first version information;
   a receiver configured to receive a command including second version information;
   a determining circuit configured to determine whether a version represented by the second version information is a next version after a version represented by the first version information; and
   a command processing circuit configured to, based on a determination result of the determining circuit and decision information that defines processes corresponding to the command and the determination result, execute processes corresponding to the received command,
   wherein
   the receiver receives the command further including the decision information,
   the command processing circuit executes processes corresponding to the received command based on the determination result and the decision information included in the received command,
   the decision information includes a truth value that defines whether a process corresponding to the command is to be executed when the version represented by the second version information is not the next version, and
   the command processing circuit executes processes corresponding to the received command when it is determined that the version represented by the second version information is not the next version and the truth value in the decision information defines that the process corresponding to the command is to be executed and does not execute the processes corresponding to the received command when it is determined that the version represented by the second version information is not the next version and the truth value in the decision information defines that the process corresponding to the command is not to be executed.

7. A communication device connected to an external device, the communication device comprising:
   a generating circuit configured to generate decision information defining one or more types of process according to a determination result on whether a version represented by second version information added to a command to be transmitted to the external device is a next version after a version represented by first version information that is stored in the external device; and
   a transmitter configured to transmit the decision information to the external device, wherein
   the decision information includes a truth value that defines whether a process corresponding to a command is to be executed when the version represented by the second version information is not the next version such that the process corresponding to the received command is executed when it is determined that the version represented by the second version information is not the next version and the truth value in the decision information defines that the process corresponding to the command is to be executed, and the process corresponding to the received command is not executed when it is determined that the version represented by the second version information is not the next version and the truth value in the decision information defines that the process corresponding to the command is not to be executed.

8. The device according to claim 7,
wherein the generating circuit generates the decision information for each command target.

9. The device according to claim 7,
wherein the generating circuit generates the decision information for each command target and each command.

10. A communication device connected to an external device that stores therein first version information, the communication device comprising:
a command generating circuit configured to generate a command including second version information and decision information defining one or more types of processes according to whether a version represented by the second version information is a next version after a version represented by the first version information; and
a transmitter configured to transmit the command to the external device, wherein
the decision information includes a truth value that defines whether a process corresponding to a command is to be executed when the version represented by the second version information is not the next version such that the process corresponding to the received command is executed when it is determined that the version represented by the second version information is not the next version and the truth value in the decision information defines that the process corresponding to the command is to be executed, and the process corresponding to the received command is not executed when it is determined that the version represented by the second version information is not the next version and the truth value in the decision information defines that the process corresponding to the command is not to be executed.

11. The device according to claim 10, further comprising a memory configured to store therein the second version information for each piece of the first identification information identifying a command target,
wherein the command generating circuit generates, for each piece of the first identification information, the command including the second version information corresponding to the first identification information and including the decision information.

12. The device according to claim 11,
wherein the first identification information is a group identification information identifying a group to which an external device belongs, and
the command generating circuit generates, for each piece of the group identification information, a command to change the group, the command to change the group including the second version information corresponding to the group identification information and including the decision information.

13. The device according to claim 12, further comprising a media key block (MKB) generating circuit configured to generate a media key block from which a designated external device is able to derive a group key,
wherein the command generating circuit generates, for each piece of the group identification information, the command to change the group, the command to change the group including the second version information corresponding to the group identification information, the decision information, information specifying the designated external device, and the media key block.

* * * * *